S. LAKE.
BATTERY.
APPLICATION FILED AUG. 6, 1912.
1,106,719.
Patented Aug. 11, 1914.
4 SHEETS—SHEET 4.
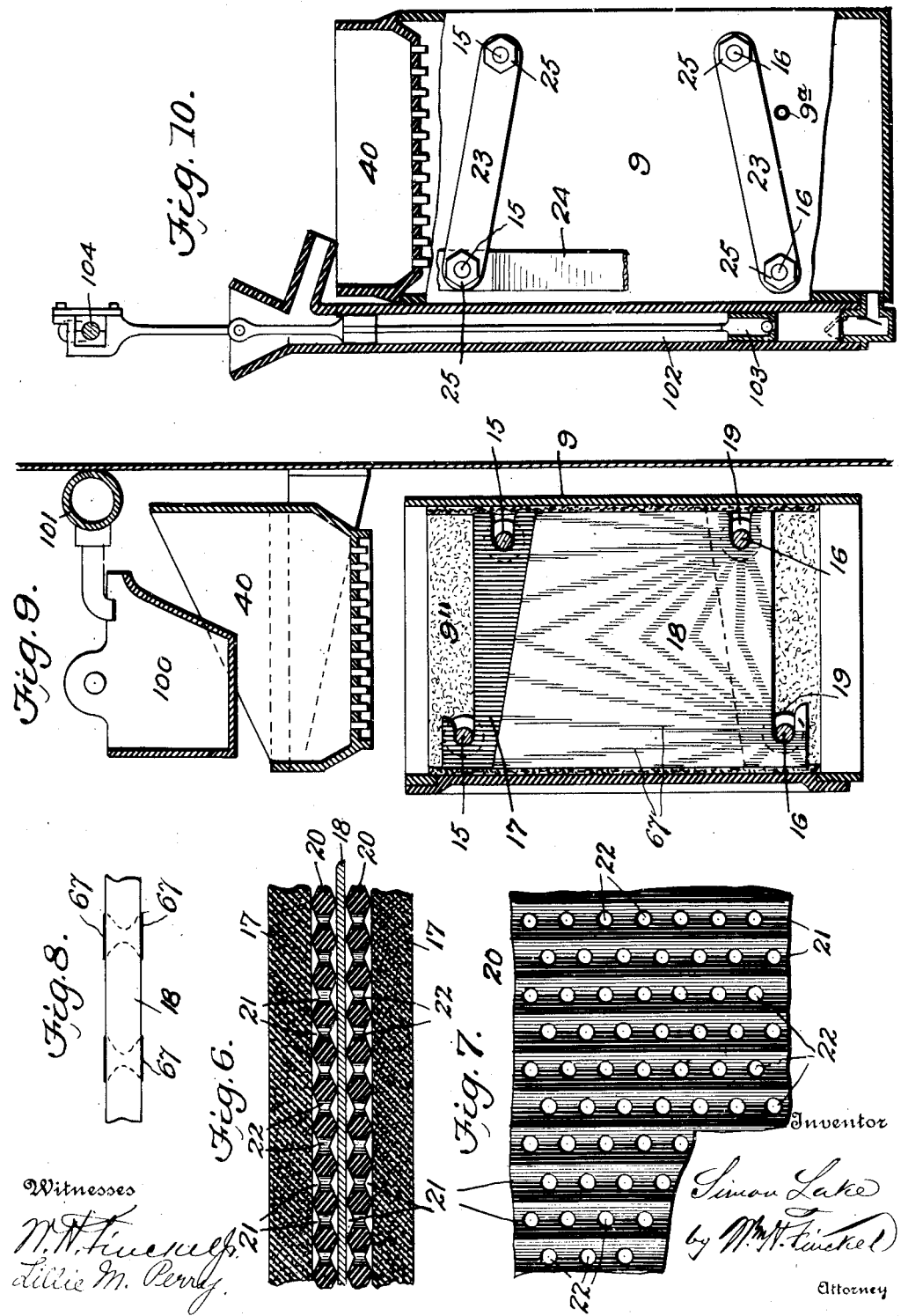

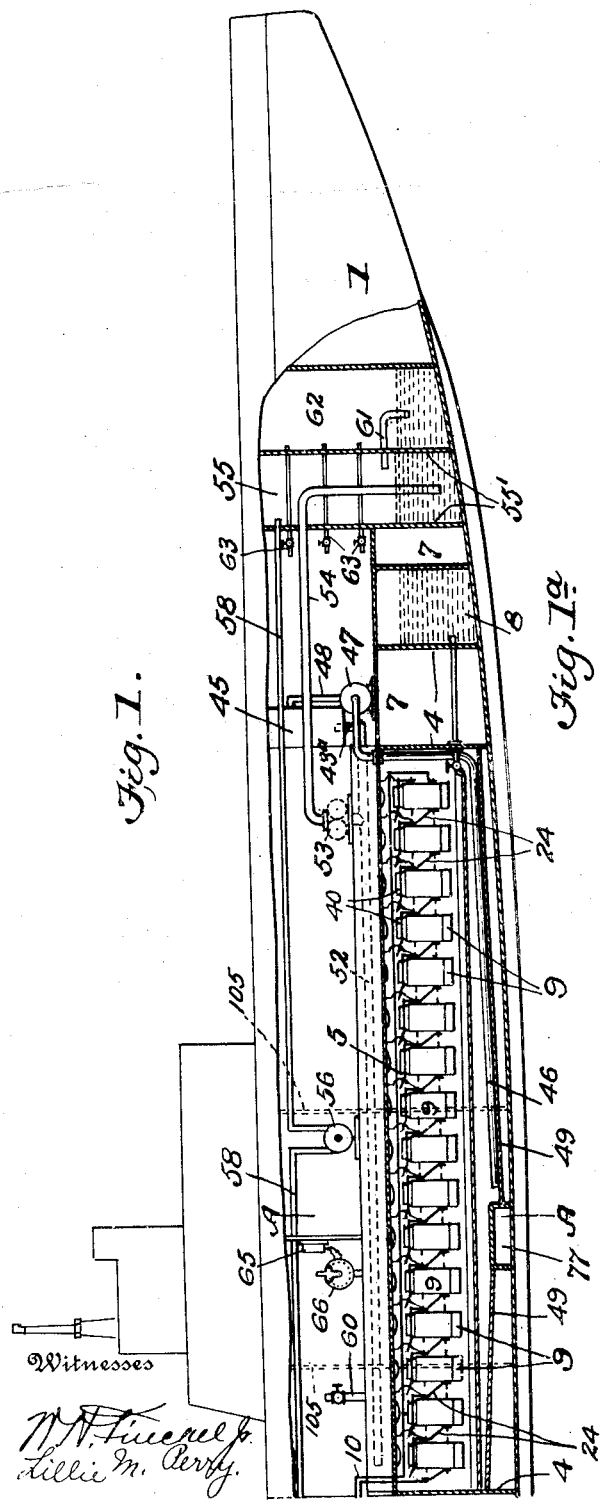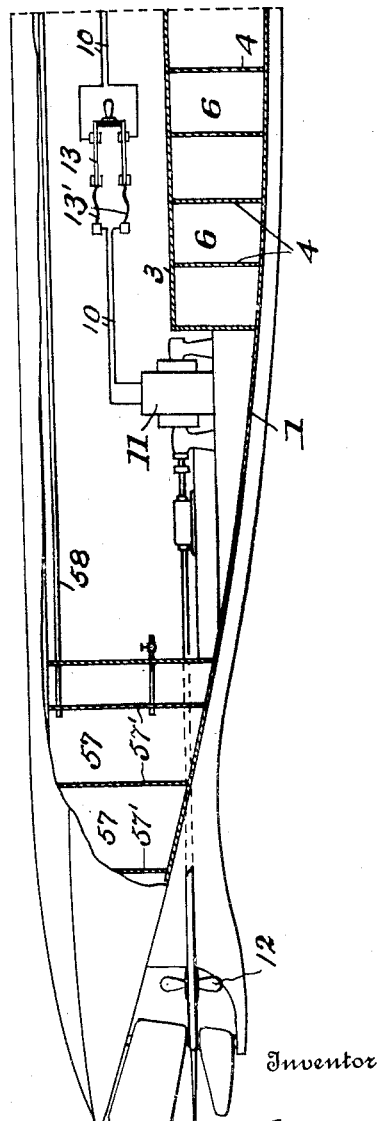

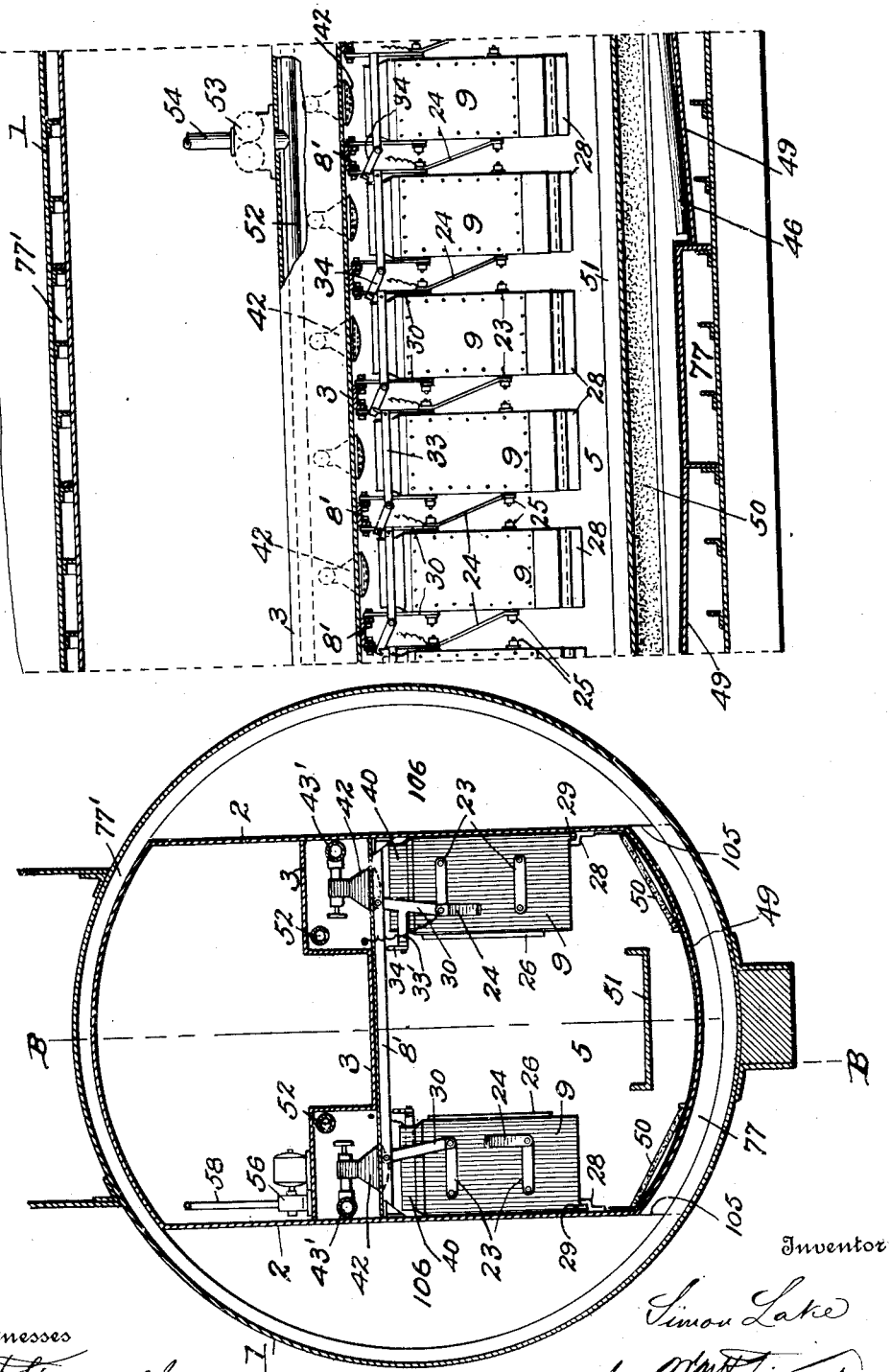

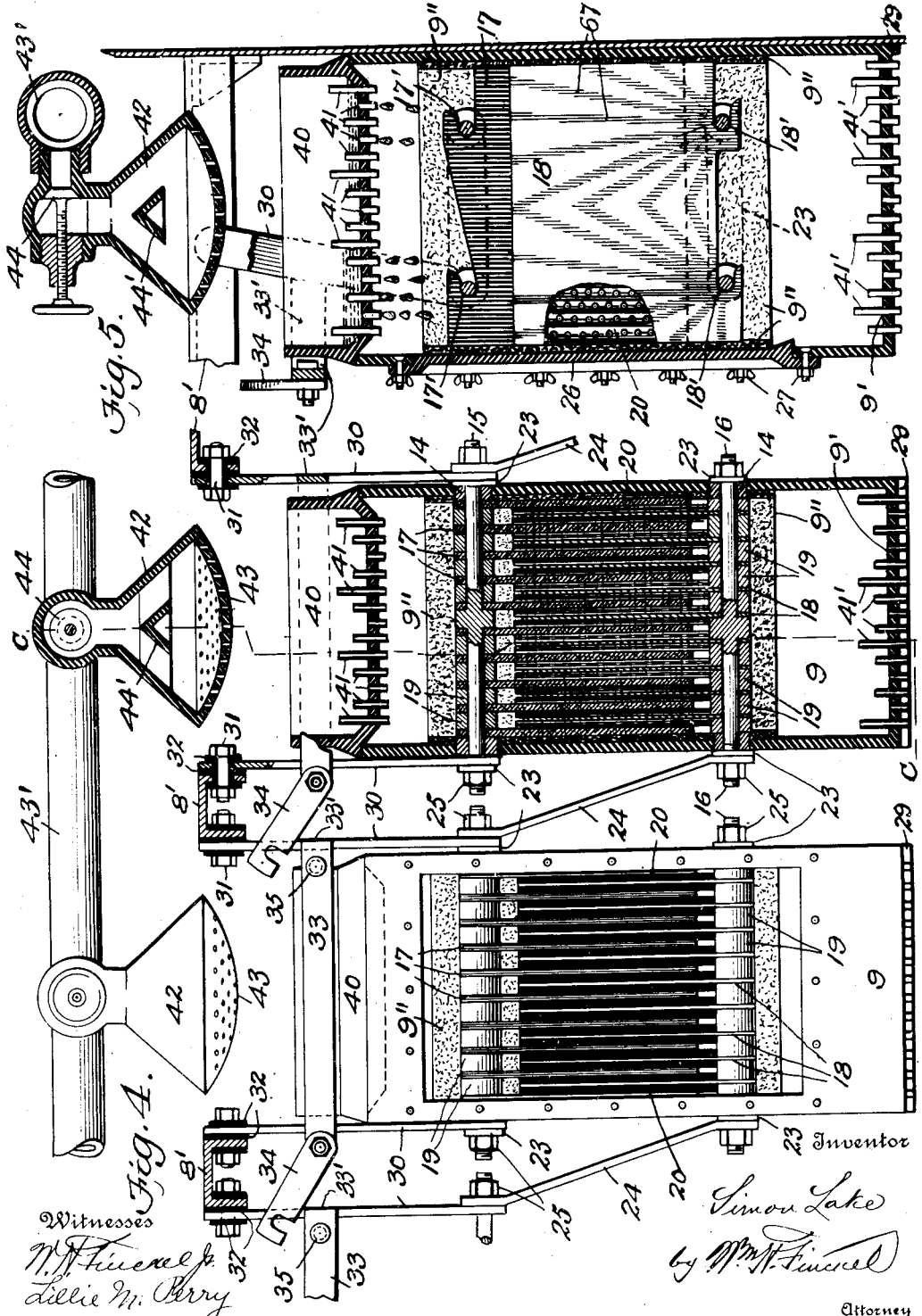

UNITED STATES PATENT OFFICE.

SIMON LAKE, OF MILFORD, CONNECTICUT.

BATTERY.

1,106,719.  Specification of Letters Patent. Patented Aug. 11, 1914.

Application filed August 6, 1912. Serial No. 713,632.

*To all whom it may concern:*

Be it known that I, SIMON LAKE, a citizen of the United States, residing at Milford, in the county of New Haven and State of Connecticut, have invented a new and useful Improvement in Batteries, of which the following is a specification.

As is known, storage-batteries are employed in submarine or submersible boats for suplying power for making submerged runs, and for electric-lighting and other purposes, and oil or gas engines are used in charging the batteries and for supplying the necessary power when the boat is operating on the surface. The power of batteries now in use is so limited that frequent charging is necessary in order to keep them in working condition, the charging being done only when the vessel is lying at the surface, and at considerable cost, and after each submerged run especially if the run, be extended.

The prime object of my invention is to provide a battery of larger capacity for its weight and space occupied than has heretofore been possible, which particularly adapts this form of motive power for submarine or submersible boats, both for surface and submerged work, whereby the engines may be dispensed with, and the cost, both for operation and installation, greatly reduced. Another object of the invention is to provide a peculiar construction of battery-cell and its electrodes, which will permit of the replacing of the electrodes as they are consumed, and also in the peculiar method of supplying the electrolyte to the cells, whereby the cells are maintained at their highest efficiency during the entire time the cells are active.

The invention consists in constructing each cell of a battery with open upper and lower ends, that is, in providing them with inlets and outlets for the electrolyte, and in causing the electrolyte to constantly circulate through the cell in contact with the electrodes during the entire time the cell is active, to thus reduce polarization effects common in such cells, and increase chemical actions and hence the efficiency and output of the cell, means being employed for breaking up the flow of the electrolyte and finally dividing it as it is fed to and escapes from the cell, to thus prevent a path of conducting medium for the current other than through the proper cell connections. The invention further consists in the peculiar construction of the electrodes, whereby they may be readily removed and new ones inserted in their place as required; in means for cutting out any one or more of the cells when new electrodes are being adjusted in place; and in means for carrying off the gases and fumes from the battery compartment. These and other features germane thereto constitute the invention, as will be hereinafter fully described and claimed.

In the accompanying drawings, illustrating the invention, in the several figures of which like parts are similarly designated, Figure 1 is an elevation, partly in section, of the amidships and forward end of a submarine or submersible boat, and Fig. 1ª is a similar view of the after end of the boat, illustrating the application of my invention. Fig. 2 is a cross-section, on a larger scale, drawn on the line A—A of Fig. 1. Fig. 3 is a longitudinal section drawn through a portion of the hull and the battery-compartment on the line B—B of Fig. 2, and showing the suction and blowing pump located near the amidships section of the boat to clearly illustrate its connection with one of the gas conducting pipes arranged in the battery compartment. Fig. 4 is a front view and vertical section, respectively, of two adjacent cells of a battery. Fig. 5 is a vertical transverse section drawn on the line C—C of Fig. 4. Fig. 6 is a horizontal section, drawn on an enlarged scale, through several of the electrodes of a cell and their spacers. Fig. 7 is a face view of a portion of one of the spacers. Fig. 8 is a diagrammatic plan view of a portion of one of the positive electrodes, drawn on an enlarged scale. Fig. 9 is a vertical transverse section of a cell, illustrating a slightly different form of electrodes and the means of feeding the electrolyte thereto. Fig. 10 is a side elevation, partly in section, illustrating still another method of feeding the electrolyte to the cell.

1 designates the hull of a submarine or submersible boat which is divided at its amidships section by longitudinal partitions 2, a horizontal partition or deck 3, and below the horizontal partition 3 by transverse partitions or bulk-heads 4 to provide a central air-tight battery-compartment 5, after water-ballast and trim tanks 6 and forward water-ballast and trim tanks 7, and a tank 8 for the storage of fresh electrolyte supply for the batteries. The partition or deck 3 is stepped, that is, its side portions are arranged higher than the central portion, to provide a central passageway of sufficient height to permit of convenient passage to and from the after and forward parts of the boat. The partition or deck 3 is supported by transverse channel beams 8' whose ends are connected to brackets extending into the battery-compartment from the sides of the longitudinal partitions 2. Upon each side of the battery-compartment 5 are series of battery-cells, which are connected together as hereinafter described, and by conducting wires 10 to suitable electric motors 11, one of which is shown in Fig. 1ª, and which, in turn are geared to the propellers 12 in suitable manner for navigating the boat. 13 designates a switch, and 13' fuses interposed in the conducting wires. Each battery-cell and parts germane thereto are substantially alike and I will therefore describe only one cell, but will apply the corresponding reference characters to similar parts throughout the several figures of the drawings. Each cell 9 is a rectangular casing or tank open at its upper end and formed with a perforated bottom 9'. The cell is constructed of preferably slightly compressible rubber, for the purpose as will hereinafter appear, and its sides adjacent to their upper and lower ends are provided with openings in which are fitted rings 14 of suitable conducting material through which bolts 15 and 16 also of conducting material are passed and which form supports for the negative electrodes 17, and the positive electrodes 18, are respectively supported. The said bolts form the bus-bars of the cell and they also provide connections for the connectors between the several cells of the battery.

The negative electrodes 17 have their upper edges formed with ears having open slots 17', and the lower edges of the positive electrodes 18 are likewise formed with ears having slots 18', the said slots being of such width to easily slip over the bus-bars when the electrodes are inserted in the cell and serve to hold them in place when properly adjusted in position. Washers 19 of suitable conducting material are carried by the bus-bars between the electrodes, and the body portions of said electrodes are held apart by spacers 20 of hard rubber, or other suitable material, provided on each side with vertical, substantially V-shaped grooves 21, and with apertures 22 which open into the base of the grooves on opposite sides of the spacers, to thereby afford communication between the grooves on opposite sides of the spacers.

The bus-bars of each set of electrodes are connected by conducting bars 23 arranged upon the outside of the cells, and to the outer end of one of the bus-bars 16 carrying the positive electrodes of each cell is connected a conducting bar 24 the opposite end of which is connected to one end of one of the bus-bars 15 of the negative electrodes. The bars 24 thus form bus-bar connectors between the cells of the battery. The several conducting bars are held in position on their respective bus-bars by nuts 25 threaded upon the outer ends of the bus-bars, and these nuts also serve to clamp the electrodes, spacers and washers firmly into contact. The tightening of the nuts also serves to force the sides of the cells toward each other and thus hold the body portions of the electrodes and the spacers firmly together, and likewise when unscrewed permit the sides of the cell to spread apart, to thus release the electrodes and spacers to permit of the ready removal of the several elements as occasion requires.

A lining of comparatively thin sponge rubber 9'' is arranged within the cell in close contact with the outer surfaces of the two end electrodes and the vertical edges of all of the electrodes, to prevent the too rapid flow of the electrolyte through the cell at these points.

By constructing the cells and the electrodes as described it will be apparent that as the electrodes become worn or as the positive electrodes are consumed or eaten by the action of the acid on said electrodes, they may be readily replaced by simply loosening the nuts 25 and inserting new plates between the spacers and slipping their slots over their respective bus-bars, and in order to facilitate the renewal of the plates without taking the cell apart I may construct the front of the cell with an opening which is normally closed by a plate door 26 held in position by thumb-nuts 27 engaging short bolts extending from the front of the cell and projecting through suitable openings in the door, as shown in Fig. 5.

The cells are supported in position within the battery-compartment some distance above the floor of the compartment by brackets 28 of suitable insulating material (Figs. 2 and 3) fixed to the partitions 2, and each cell has its rear lower edge formed with a downwardly extending rib 29 to engage its bracket. The front of each cell is supported by flat bars 30 depending from the channel-beams 8' and having their lower ends formed with eyes fitting over the outer ends of the upper front bus-bars 15. The bars 30 are insulated from the channel-beams and their connecting bolts in any suitable manner, and for the purpose of illustration I show the bolts (31) and the contacting faces of the bars and channel-beams covered with hard rubber, as shown at 32, Fig. 4. The cells, as shown, are arranged in longitudinal alinement and electrically connected one to the other, and in order that any one cell of a group or battery may be "cut-out" to permit of inspection or the replacing of any of its elements, I provide one of the bars 30 of each cell with a forwardly extending arm 33' to the outer end of which is connected a bar 33 extending across the face of its cell, and to the free end of this bar 33 is pivotally connected a link 34 the free end of which is formed with an open slot adapted to engage a stud 35 fixed to the inner end of the bar 33 of the adjacent cell. By this arrangement it will be evident that by dropping the link of any one cell to cause it to engage its coacting stud 35 the current will jump the particular cell thereby permitting the above stated operations without danger to the attendant.

To supply the exciting element, the electrolyte, to each cell individually, and to supply it thereto and carry it from the cells in drops in rain-like manner, as distinguished from a continuous single stream to avoid any danger of the current escaping from the cells through the liquid, which would occur if the liquid were fed to and carried off in a continuous stream, I provide the following arrangement: Upon the top of each cell is arranged a box 40, which I prefer to call a "rain-box", the bottom of which is formed with a plurality of small apertures in which are fitted tubes 41 extending slightly below the bottom of the box, as shown, and in order to regulate the supply of the electrolyte to the cells according to the power to be derived therefrom, I extend the tubes upwardly into the box at different heights, so that when only a small supply of liquid is dropped or otherwise let into the box it will only escape through the tubes whose upper ends are flush with the inner side of the bottom, and as more power is to be derived a larger supply is let into the box to raise the level of the liquid so that it will escape through the next set of tubes and so on. This arrangement also insures the feeding of the liquid to the cells in drops like rain, as illustrated in Fig. 5, wherein on opposite sides of the rain-box the liquid is shown at different levels and escaping from the tubes of different heights.

The electrolyte is supplied to the rain-boxes 40 preferably from droppers 42, one of which is arranged over each rain-box. The droppers are substantially alike, and each is a closed receptacle having a concavo-convex perforated bottom 43 and is carried by a common supply pipe 43' extending longitudinally through the upper section of the battery-compartment 5. A valve 44 is arranged in each receptacle to control the inlet of the electrolyte thereto, and each receptacle is provided with a baffle-cone 44' to spread the liquid as it enters the receptacle to thus evenly distribute it over the entire surface of the bottom thereof.

A supply pipe 43' is arranged at each side of the battery-compartment, and said pipes are connected to a common pipe 43" which extends from a supply tank 45 arranged in the forward end of the boat above the level of the pipes 43', so that the liquid will flow into the pipes by gravity. The liquid as it escapes from the cells is taken up by a pipe 46 extending from a motor driven suction-pump 47 having a discharge pipe 48 connected with the tank 45. Thus as the liquid escapes from the cells it is pumped back into the tank 45 from which it again finds its way to the cells, and thus used over and over again as long as the batteries are maintained active. The bottom of the battery-compartment is provided with an inclined floor 49 to cause the liquid to flow toward the mouth of the pipe 46, and under each group of cells is arranged a mat 50 (Figs. 2 and 3) preferably of asbestos, upon which the liquid drops as it escapes from the cells. The mats are designed to prevent the splashing of the liquid and also to decrease the tendency of the liquid to creep up the sides of the compartment. They also form filters and collect the mercury and small particles of the zinc electrodes which drop from the cells as the said electrodes decompose and disintegrate. A platform 51 is arranged in the compartment some distance above the floor to provide a working platform to facilitate the work upon and the inspection of the cells. The platform is supported in any suitable manner.

In order to collect and carry off the gases and fumes from the battery-compartment as they are emitted from the batteries during their activity, I arrange a pipe 52 upon each side and at the top of the compartment. The pipes extend throughout practically the entire length of the compartment and are provided with inlet openings, and adjacent to one end the pipes are extended through the horizontal partition of deck 3 and have their outer ends connected to suitable suction and blowing pumps 53 mounted in the boat. The discharge pipes 54 from the pumps extend into a tank 55 formed by bulk-heads 55' in the bow of the boat and in which tank is held a suitable liquid for absorbing carbonic acid gas, so that the hydrogen will rise to the top of the tank and may be withdrawn therefrom and compressed, through the medium of a motor driven compressor 56, into a tank or tanks 57 located in the stern of the boat formed by bulk-heads 57' as shown. The compressor 56 is piped to the several compartments through pipes 58 as shown in Figs. 1 and 1ᵃ. Pure air is let into the battery-compartment through valve controlled pipes 60, which may communicate direct with the interior of the boat or with compressed air tanks or bottles as preferred.

Immediately above the liquid level in the tank 55 is arranged the inlet mouth of a pipe 61 which extends into a tank 62 located forward of the tank 55 and in which is held a suitable liquid, lime water for instance, which purifies the air as it passes therethrough so that it may be drawn off from the tank 62 and used in the boat as required. As shown the pipes 54 and 61 have their discharge mouths extended into the liquid in their respective compartments or tanks. Suitable connections 63 are made with the tank 62 at different heights whereby the air may be withdrawn at different heights and tested. In practice a slight pressure will be maintained in the tank 62 so as to permit the discharge of the air therefrom. The hydrogen gas is compressed in the tanks 57 from which it may be withdrawn and used in the boat for heating, lighting and other purposes when the boat is at the surface or operating in surface conditions.

65, Fig. 1, designates a voltmeter for testing the working efficiency of the battery, and 66 is a suitable switchboard arranged in the circuit between the voltmeter and the battery for connecting the voltmeter with the individual cells of the battery.

Further understanding of my invention will be best understood from the following description of its operation: The electrolyte is first pumped into the tank 45, and when the batteries are to be rendered active the electrolyte is allowed to run down into the supply pipes 43' from which it escapes into the droppers 42 when the valves 44 are opened and thence into the rain-boxes 40 from which it drops in a shower-like condition onto the tops of the electrodes and spacers and runs down through the grooves formed in the said spacers into contact with the positive and negative electrodes thus setting up an electric current in the same manner as with the present construction of batteries wherein the positive and negative electrodes are permanently held in the electrolyte. The advantages however, of causing the electrolyte to constantly circulate through the cells are that polarization and local chemical actions are avoided and the gases carried off from the cells which thus greatly increases the efficiency of the cell. It is well known that where the electrolyte is permitted to lie constantly against the electrodes, the output and efficiency of the cell is greatly reduced by reason of the local chemical actions and polarization. After the electrolyte passes through the cells, it is pumped up through the pipe 46 and back into the supply tank 45 from which it again runs back to the cells as previously explained. As the battery is used the positive electrodes are gradually eaten away by the electrolyte and the capacity of the cell thus gradually decreased. Therefore I provide the cells with openings in their fronts, and with the peculiar arrangement of the busbars and also the means for jumping the current around any one or more of the cells, as described, whereby the consumed or partly consumed electrodes may be replaced with fresh ones without necessitating the shutting down of the motor.

With my type of battery, extra electrodes may be carried in the vessel to replace those of the cells that become worn, to thus keep the batteries up to their highest efficiency. It is understood that the capacity of a battery depends upon the surface of the electrodes exposed to the action of the electrolyte, the ability to supply the cells with fresh cool electrolyte, and the ability to reduce polarization effects and local chemical actions while the battery is discharging as a primary battery or when it is being charged as a secondary battery. The life of a battery largely depends upon the thickness of the electrodes, and for example, while electrodes one-half an inch ($\frac{1}{2}''$) in thickness may have a longer life than an electrode of less thickness, they are not heavy but have only an amperage capacity of only one half that of a cell made up of one-quarter inch ($\frac{1}{4}''$) thick electrodes, and a cell composed of one-eight inch ($\frac{1}{8}''$) thick electrodes would have four times the capacity of the cell having one-half inch ($\frac{1}{2}''$) thick electrodes. Therefore, it is obvious that in cells of this type much greater amperage hour capacity can be carried in a given space and with a given weight of electrodes than is possible with the present type of storage-batteries now in common use, especially in submarine boats, for the reason that it is practical to use much thinner electrodes and to carry a supply of extra electrodes of either the primary or secondary type of battery, so that renewals of the consumed or worn out electrodes may be made to thus maintain the battery at its highest efficiency and without shutting down the motors driven thereby.

In order to prolong the life of the positive electrodes and to carry the current thereof to their bus-bars when the electrodes become partly consumed, I purpose to stripe them as shown in Figs. 5, 8 and 9, with asphaltum or other substance 67 impervious to the acid, so that even when parts of the surface of an electrode is eaten entirely through the same sufficient conducting surface will be left to carry the current to the bus-bars or poles, and by partly covering the electrodes as illustrated they will be gradually eaten away, as shown in dotted lines in Fig. 8, so that a conducting surface or surfaces will remain until practically the entire electrode is consumed or falls apart. This method of treating the positive electrodes also decreases their tendency of breaking apart when only partly consumed.

From time to time the cells are tested to ascertain their output, and by which the attendant may readily determine the condition of the electrodes, and whether or not they require replacing to restore the full capacity of the cell. The battery current is jumped over any one cell by dropping the link 34 co-acting therewith over the stud of the adjacent cell, whereby the consumed or partly consumed electrodes may be rapidly replaced without suspending the operations in the boat or the shutting down of the motive power. When new electrodes are being inserted in a cell, the supply of the electrolyte to the cell is, of course, shut-off by closing the valve 44 in its dropper. It will thus be seen that an exceedingly simple and efficient cell is provided, the advantages of which will readily appear to those skilled in the art to which the invention relates.

To prevent the electrolyte from running from the cells in streams, and to cause it to escape therefrom in drops like rain, to avoid any tendency of the current being carried from the plates through the electrolyte, I preferably perforate the bottoms of the cells and insert tubes 41' in the perforations in the same manner as in the rain boxes 40. However, I do not wish to limit myself to this particular arrangement, as the bottom of the cell may be made entirely open as shown in Fig. 9, or with a single opening as shown in Fig. 10, which will be hereinafter more fully referred to. I therefore desire the statement "open at its upper and lower end" to be construed as meaning any form or construction of a cell wherein its upper and lower ends will permit the passage of the electrolyte therethrough during the activity of the cell.

In Fig. 9, I illustrate a slightly different method of supplying the electrolyte to the rain-boxes, in which I employ ladles 100 supported upon a rotatable shaft and designed to be rocked at intervals to pour the liquid into the rain-boxes 40. The liquid is supplied to the ladles through supply pipes 101 located in the upper part of the battery-compartment, and which extend from the supply tank in the same manner as do the pipes 43'. In this arrangement, I also illustrate a slightly different form of electrodes for the cells, in which the upper and lower ends of the positive and negative; respectively, are beveled or inclined from their outer toward their inner vertical edges to facilitate the insertion of the electrodes into the cells. Also in this construction the bus-bars are arranged out of horizontal alinement, and the slots at the inner sides of the electrodes are open at the vertical edges thereof. This form of electrodes provides a larger surface for electrolyte.

In Fig. 10, I illustrate a further construction of cell, in which the bottom of the cell is shown closed and the front face provided with an opening which communicates with a pump casing 102 formed with or secured to the removable front or door of the cell. A piston 103 operates in the pump cylinder, and has its upper end operatively connected to a crank-shaft 104 mounted in the battery-compartment above the cells. This construction makes each cell independent of a common supply of electrolyte and self supporting, as the electrolyte is pumped from the bottom to the top of the cell and deposited on the tops of the electrodes, and thus used over and over again. In this form, each cell may have a pipe 9$^a$ connected thereto for carrying off the gases generated therein through the action of the acid upon the electrodes. The pipes are extended from a suitable suction pump (not shown) which may be located in any convenient place in the boat.

At the amidships section of the boat, the hull is divided by athwartship partitions or bulk-heads 105 to provide a main water-ballast tank 106 which surrounds the battery-compartment 5, the tanks on either side of the boat being in communication at the bottom of the hull through a conduit 77 and at the top of the hull through a conduit 77' as shown most clearly in Fig. 2. It will be evident that as water is let into the tank from either side of the boat it will readily flow into the tank on the opposite side through the conduit 77, the channel 77' at the top providing an air passage whereby to permit the free flow of the water as will be readily understood.

In practice the floor and walls of the battery-compartment will be covered with insulating material to prevent the acid from contacting with the metallic parts of the boat.

What I claim is:—

1. A battery, comprising a series of cells containing positive and negative electrodes, each cell being open at its upper and lower ends, to permit circulation of electrolyte therethrough, for the purpose specified, and means for supplying electrolyte to said cells in a multitude of drops in rain like manner over the tops of said electrodes.

2. A battery, comprising a series of cells having positive and negative electrodes held therein, each cell being open at its upper and lower ends, to permit circulation of electrolyte through said cells, a source of electrolyte supply for the cells, and means to feed the electrolyte to said cells in a shower of drops in rain-like manner over the tops of said electrodes and to cause it to escape therefrom in a similar condition.

3. A battery, comprising a plurality of cells, open at their upper and lower ends to permit circulation of electrolyte through the cells, positive and negative electrodes detachably supported in each cell, a box having a perforated bottom mounted on each cell adapted to hold and feed electrolyte to the cells in a multitude of drops in rain-like manner over the tops of said electrodes, a source of electrolyte supply for said boxes, and means for governing the supply to said boxes.

4. A battery, comprising a series of cells open at their upper and lower ends, to permit circulation of electrolyte therethrough, bus-bars fixedly mounted in the sides of said cells, positive and negative electrodes supported upon said bus-bars within the cells, spacers arranged between said electrodes having vertical grooves, for the purpose specified, means to feed electrolyte to the cells, and a source of electrolyte supply for said feeding means.

5. A battery, comprising a series of cells open at their upper and lower ends, to permit circulation of electrolyte therethrough, each cell having an opening in its front wall and a door for closing said opening, positive and negative bus-bars extending respectively through the upper and lower ends of each cell adjacent to the upper and lower edges thereof, positive and negative electrodes having open slots in their upper and lower edges thereof, positive and negative electrodes having open slots in their and lower edges respectively engaging said bus-bars, perforated spacers arranged between said electrodes and having vertical grooves on each side thereof with which said perforations communicate, a box having a perforated bottom mounted on each cell for holding electrolyte and adapted to feed the electrolyte to the cells in drops, for the purpose specified, a source of supply for said boxes, and means for collecting the electrolyte after it passes through the cells and returning it to said supply source.

6. A battery, comprising a series of cells open at their upper and lower ends, to permit circulation of electrolyte through the cells, each cell having an opening in its front wall, a closure for said opening, positive and negative bus-bars mounted in and extending transversely through the cells, positive electrodes mounted upon said positive bus-bars, negative electrodes mounted upon said negative bus-bars, said positive and negative electrodes having open slots adapted to engage their respective bus-bars to facilitate their engagement with said bus-bars, spacers arranged between said electrodes and having grooves upon opposite sides and perforated to afford communication between the grooves upon opposite sides thereof, a box for holding electrolyte arranged upon each cell and having a perforated bottom, tubes of different heights arranged in said perforations and extended below the bottom of said box, a dropper arranged above each box, a source of electrolyte supply connected to the droppers, means to control the supply to each of said droppers, and means for taking up the electrolyte after it passes through the cells and returning it to said supply source.

7. A battery cell, comprising a tank having its upper end open, an opening or openings in its bottom, and an opening in one of its vertical walls, a closure for the opening in the wall, bus-bars extending through the cell adjacent to its upper and lower ends, positive electrodes detachably supported upon the upper bus bars, negative electrodes supported upon the lower bus-bars, spacers of non-conducting material arranged between said electrodes and having vertical grooves in its opposite side faces and perforated to afford communication between the grooves upon opposite sides thereof, and means for circulating electrolyte through the cell, for the purposes specified.

8. In a battery-cell, a tank constructed of slightly compressible non-conducting material having an open upper end, an opening or openings in its bottom, and an opening in one of its vertical walls, a removable closure for said wall opening, bolts providing bus-bars arranged through the cell adjacent to its upper and lower ends, positive and negative electrodes detachably connected to said upper and lower bus-bars, respectively, spacers of non-conducting material arranged between the body portions of the electrodes, washers of conducting material carried by the bus-bars and arranged between the electrodes, nuts threaded upon the ends of the bus-bars, for the purpose specified, and a lining of sponge rubber arranged in the cell and surrounding the electrodes.

9. A battery, comprising a series of cells, bus-bars arranged therein, positive and negative electrodes detachably supported by said bus-bars, means to supply electrolyte to the cells to render them active, each cell having an opening in one of its vertical walls through which said electrodes may be removed from or inserted in the cells, and a cover for each of said openings.

In testimony whereof I have hereunto set my hand this third day of August, A. D. 1912.

SIMON LAKE.

Witnesses:
C. E. ADAMS,
M. D. BLONDEL.

It is hereby certified that in Letters Patent No. 1,106,719, granted August 11, 1914, upon the application of Simon Lake, of Milford, Connecticut, for an improvement in "Batteries," errors appear in the printed specification requiring correction as follows: Page 2, line 48, after the word "having" insert the word *open;* page 4, line 94, before the word "heavy" insert the word *only;* same page, line 95, first occurrence, strike out the word "only"; page 6, lines 34–36, strike out the words and comma "thereof, positive and negative electrodes having open slots in their and lower edges"; and that the said Letters Patent should be read with these corrections therein that the same may conform to the record of the case in the Patent Office.

Signed and sealed this 1st day of September, A. D., 1914.

[SEAL.]

R. F. WHITEHEAD,
*Acting Commissioner of Patents.*